H. SMITH.
CONVERTIBLE AUTOMOBILE BODY.
APPLICATION FILED FEB. 20, 1911.
1,170,568.
Patented Feb. 8, 1916.
5 SHEETS—SHEET 1.
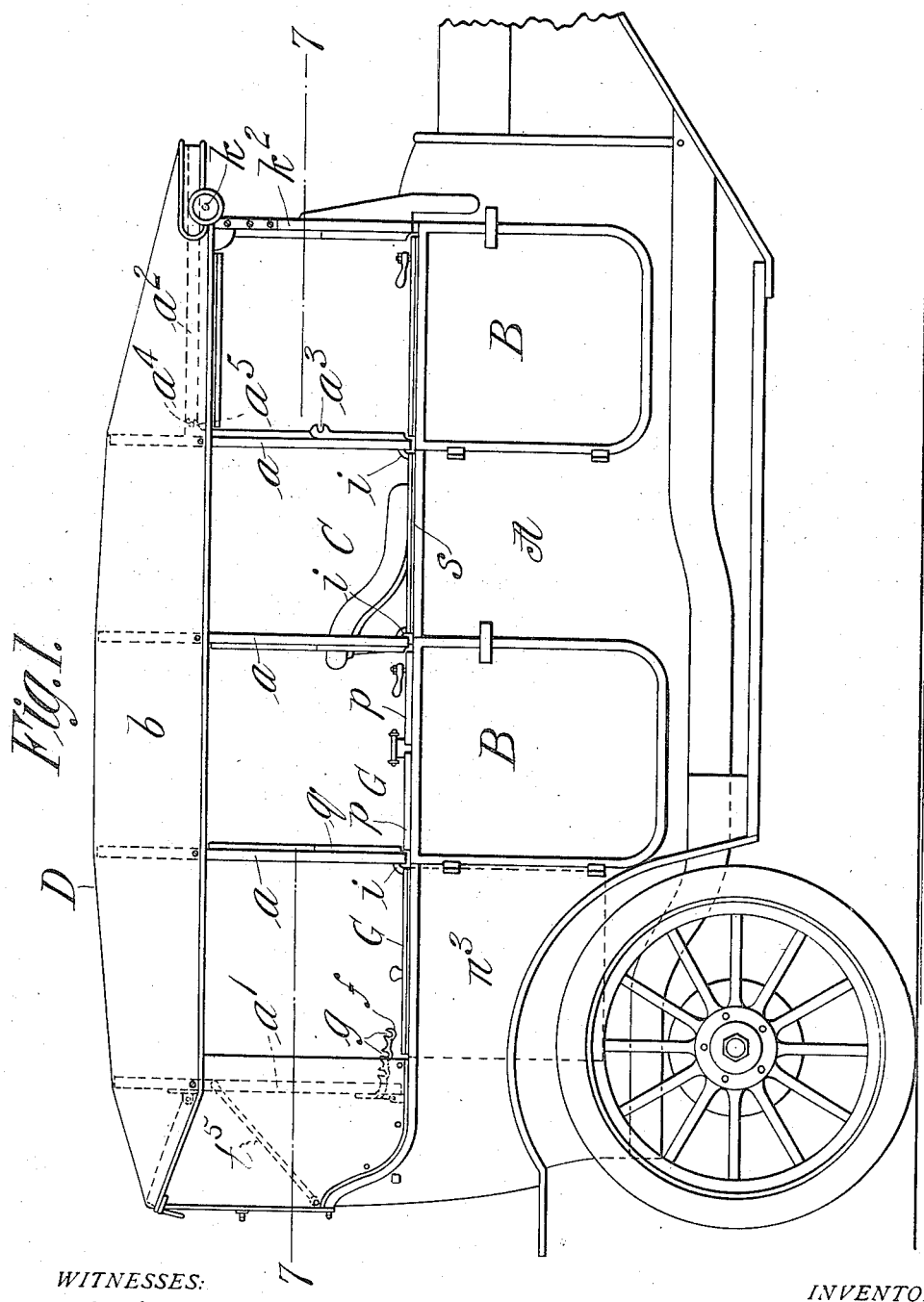
WITNESSES:
INVENTOR,
Hinsdale Smith,
BY 
ATTORNEY.

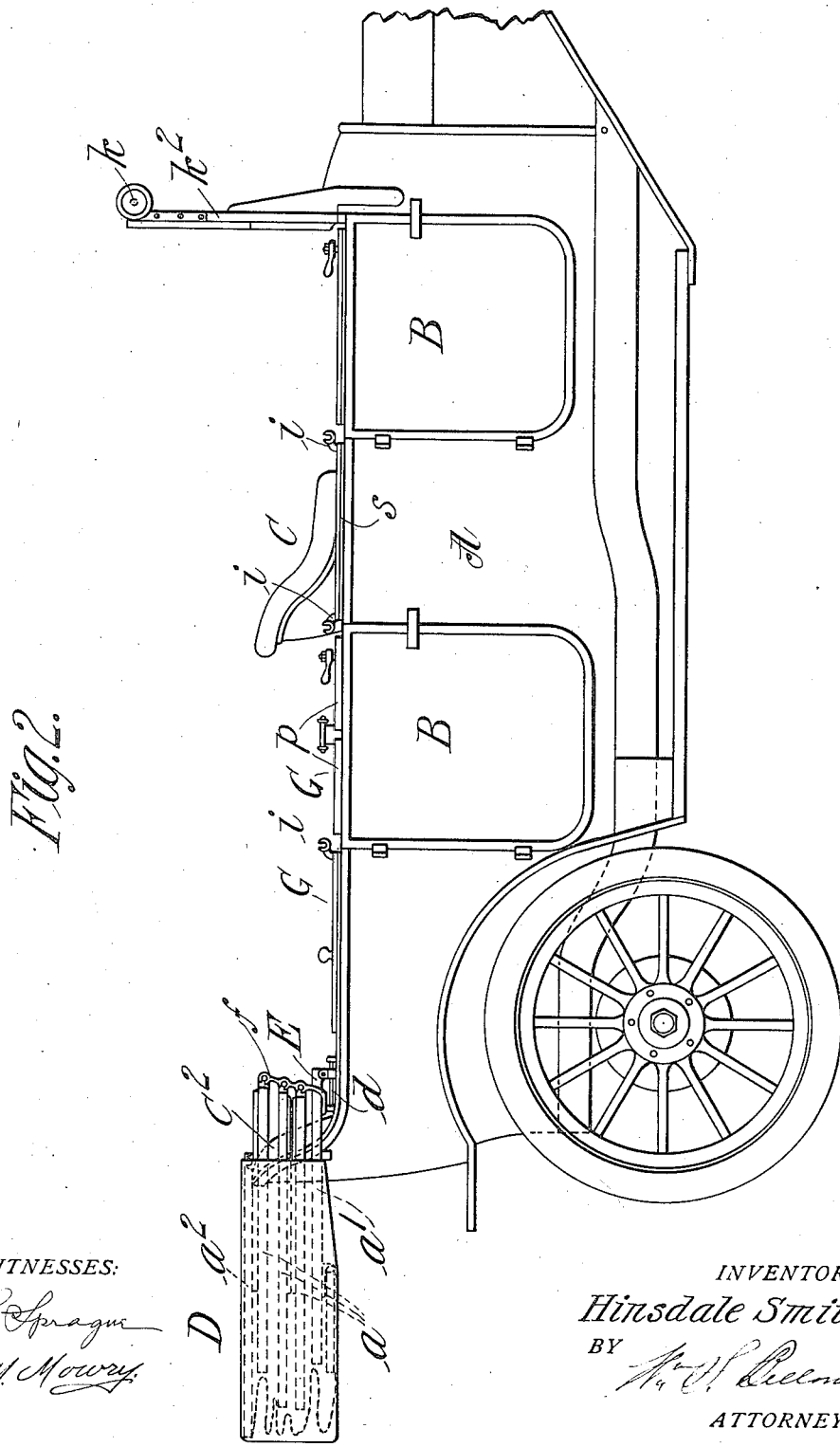

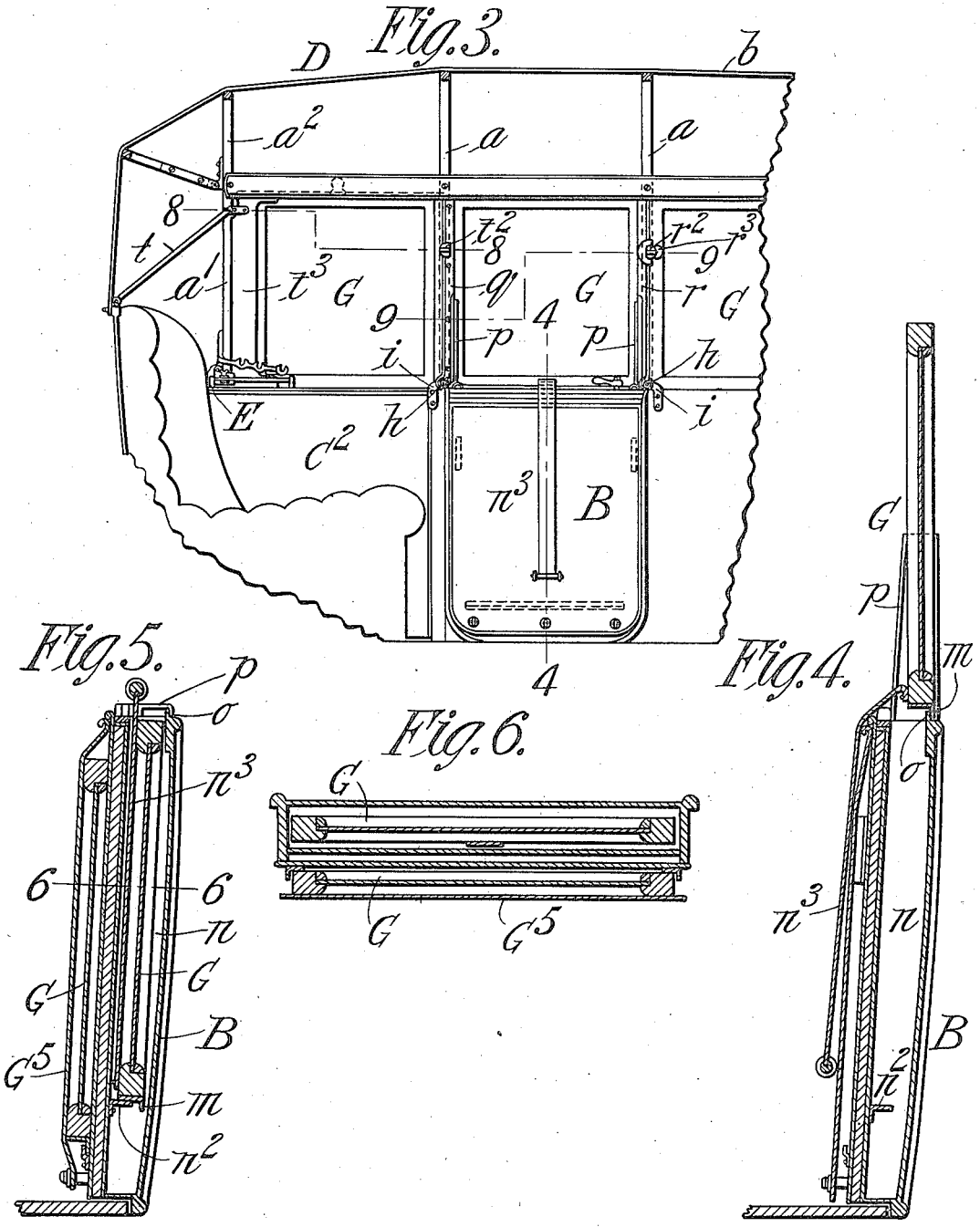

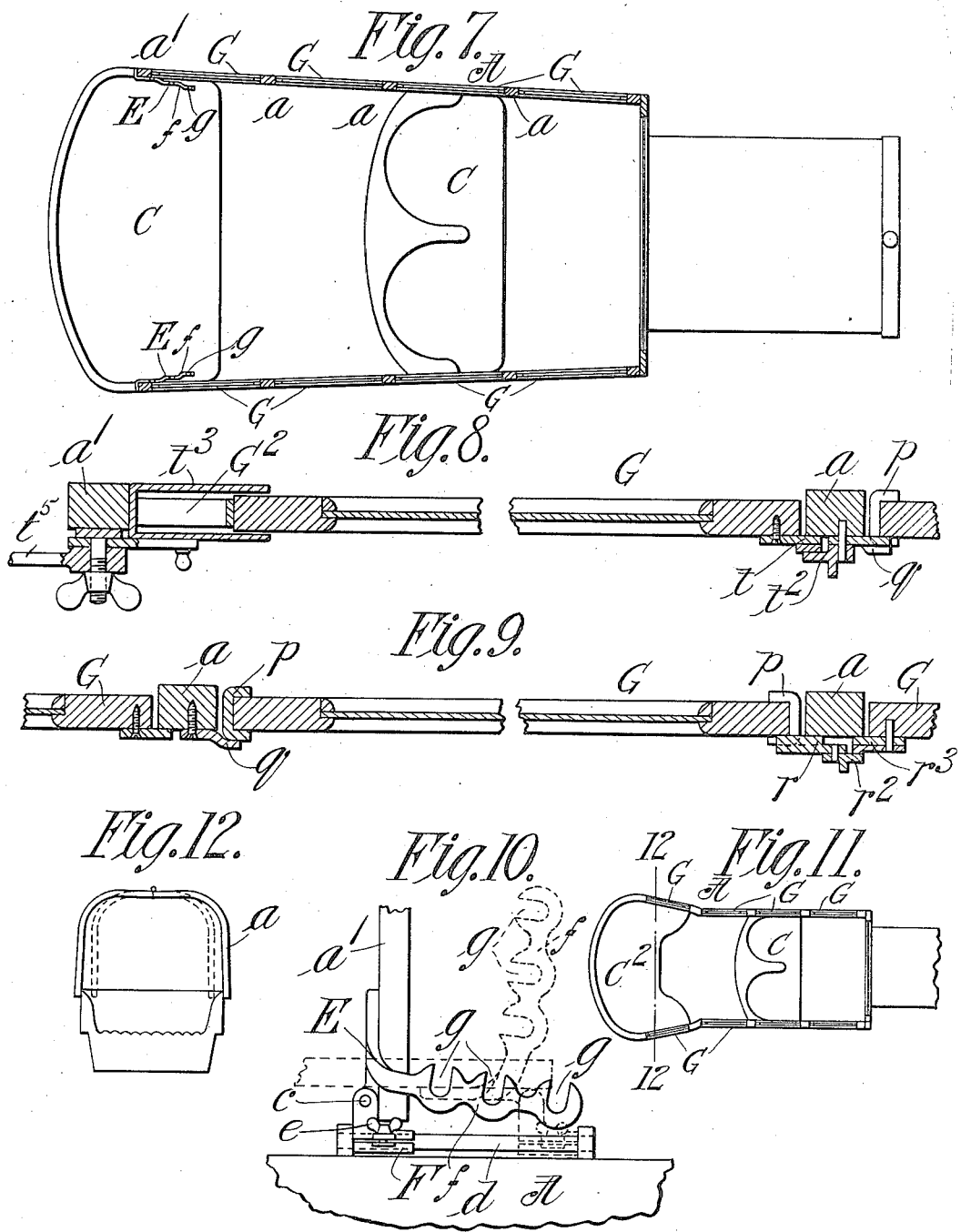

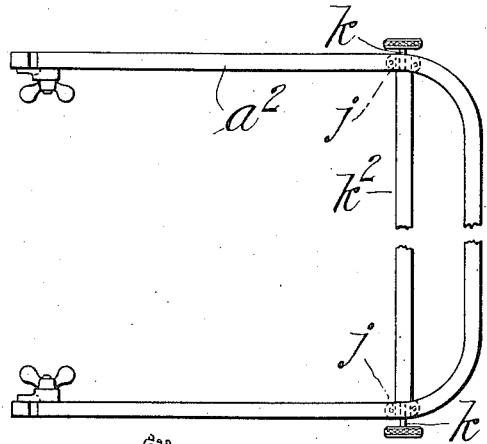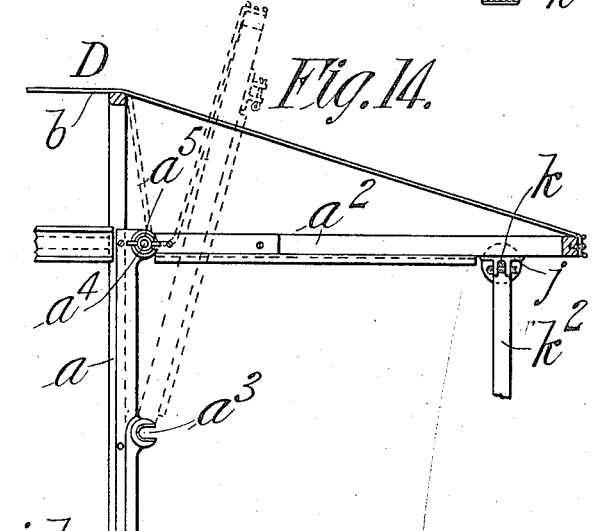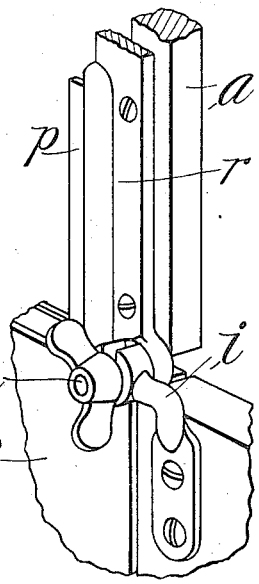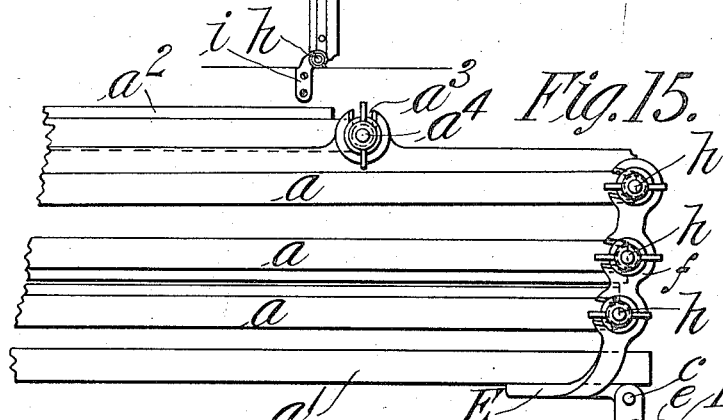

UNITED STATES PATENT OFFICE.

HINSDALE SMITH, OF SPRINGFIELD, MASSACHUSETTS, ASSIGNOR TO THE SPRINGFIELD BODY COMPANY, OF SPRINGFIELD, MASSACHUSETTS, A CORPORATION OF MASSACHUSETTS.

CONVERTIBLE AUTOMOBILE-BODY.

1,170,568.　　　　Specification of Letters Patent.　　　Patented Feb. 8, 1916.

Application filed February 20, 1911. Serial No. 609,564.

*To all whom it may concern:*

Be it known that I, HINSDALE SMITH, a citizen of the United States of America, and resident of Springfield, in the county of Hampden and State of Massachusetts, have invented certain new and useful Improvements in Convertible Automobile-Bodies, of which the following is a full, clear, and exact description.

The object of this invention is to provide improved means whereby an automobile may be rendered suitable for utilization as a closed vehicle resembling, and having the desirability of, a limousine, landaulet or cabriolet, and whereby, at pleasure, and with requirement for dismantling but very few of the equipments, the automobile may be converted to appear as an attractive touring car.

The subject matter of my present invention is fully described hereinafter, with reference to the accompanying drawings, the advantages thereof are set forth in conjunction with the description of the various parts and the arrangements thereof, and the invention is defined in the appended claims.

In the drawings:—Figure 1 is a side elevation of the body of the vehicle with the normal parts as positioned and arranged to make in readiness by the raising, or insertion, of the windows, a closed body resembling a limousine or landaulet. Fig. 2 is a side elevation of the same vehicle when appearing as an open touring car. Fig. 3 is a sectional elevation of the rear portion of the closed body. Fig. 4 is a vertical sectional view on a larger scale through a door-provided portion of the body, as taken on line 4—4, Fig. 3, the window being in its elevated and body closing position. Fig. 5 is a view similar to Fig. 4, but showing the window as lowered within the pocket therefor in the door. Fig. 6 is a horizontal cross section on line 6—6, Fig. 5. Fig. 7 is a general plan and partial horizontal sectional view as taken on line 7—7, Fig. 1, this view being designed for showing forms and arrangements in a general way and in which, owing to the small scale on which the same is drawn, the showing of some detail parts is purposely omitted. Fig. 8 is a horizontal sectional view on a larger scale taken on line 8—8, Fig. 3; and Fig. 9 is similarly a horizontal sectional view on line 9—9, Fig. 3. Fig. 10 is a side elevation in detail showing one of duplicated brackets for receiving temporary engagement therewith of the several foldable bows comprised in the flexible top,—the dotted lines indicating a changed position and arrangement of the bracket when the body is open. Fig. 11 is a general plan similar to Fig. 7 but showing a slightly different contour of tonneau body. Fig. 12 is a front elevation or diagram illustrating a hinged feature of top supporting bow to be hereinafter referred to and explained. Fig. 13 is a plan view of the normally horizontal bow, for supporting the forward upper portion of the flexible top, shown in its relation to the upright wind shield frame,—Fig. 14 being a sectional elevation of the same. Fig. 15 is a view similar to Fig. 10 but positively showing by full lines the positions and relations of the parts when the top is folded as represented in Fig. 2. Fig. 16 is a perspective view to show the detail construction of the means of detachable connection of the bows of the foldable top with the sides of the body of the car.

The example of automobile body A here shown is of the fore door torpedo type having two doors B B and forward and rear seats C, C², each understood as being of width suitable to carry two or more persons.

The top D comprises, as here shown, a rear bow $a'$ and three other similar bows $a\ a\ a$ forward thereof, the hood or vizor supporting bow $a^2$, the rear end of which is detachably connected to an upper portion of the forward upright bow $a$, and which when the top is up occupies a substantialy horizontal position, and the covering $b$ of flexible material.

The opposite parallel depending legs of the rear bow $a'$ are fastened in a secure manner to the brackets E, the form of which is clearly shown in Figs. 10 and 15; and such bracket at each side of the body is by pivot $c$ hinge-connected to an ear lug of a slidable block F which is mounted on a runner bar $d$. Each of the brackets E is provided with a normally horizontal rigid, extension $f$ made with upwardly opening recesses or sockets $g\ g\ g$ to receive the supporting engagement therein of the short horizontally extending rigid studs $h$ provided at the lower ends of the legs of the bows, when the top is to be folded and collapsed and swung from its upright position, Fig. 1 (here considered the normal position) to the more or less horizontal position and in rearward extension on the body as shown in Fig. 2.

The body has at each side thereof the brackets *i i* (see Figs. 3 and 16) made with stud receiving sockets, $i^2$ similar to the aforementioned sockets *g* so that when the top is to be in its normal and set up condition the lower ends of the opposite legs of the several bows will be stably held in the brackets *h*, it being understood that these duplicated brackets are provided in exact or approximately uniformly spaced arrangement one to the rear and another just forward of the opening in the side of the body for the rear door, while another of these brackets has its location at the upper edge portion of the body just to the rear of the opening for the fore door.

The horizontal bow $a^2$ has at each side thereof just to the rear of its forward leg-uniting part a depending bracket *j* made with a downwardly opening recess so as to straddle over and have engagement with a short shaft or stud like part *k* formed as an appurtenance of and laterally extending from the wind shield frame; and when the bifurcated bracket is engaged about the part *k* it may be detachably secured by a cotter pin, as indicated in Fig. 14. The shaft like part *k* may be a provision now commonly found on, and having to do with the adjustment of, tiltable wind shields, an accepted type of which is represented in the present drawings. The forward one of the set of bows *a* has a forwardly opening socket $a^3$, Figs. 1 and 14, into which the stud $a^4$ at the end of the leg of the upper horizontal bow $a^2$ may be transferred to the lower position from the similar socket $a^5$ as represented in Fig. 14 by dotted lines. This contrivance provides that when the vehicle is to be converted to an open one and the top is rearwardly collapsed, and then as a whole swung down to an approximately horizontal position overhanging the back of the body, the horizontal front bow $a^2$ will not protrude excessively far rearwardly as in the absence of the capability for its readjustment it would do to the detriment of the appliance.

In the operation of collapsing the top, the three bows *a a a* are transferred while still standing vertically from their mounting in the brackets *h*, and transferred to the sockets *g* in the bracket E while the latter remains with its socketed part *f* in the horizontal position shown in Fig. 10. The slide block F on which the said bracket E is hinge connected is then slid forwardly on the runner bar *d* and the compactly disposed top is then swung to the position represented in Figs. 2 and 15. The slide block F is constructed as of a split formation whereby it is constrictive about the runner bar, and it may be clamped or bound in either its normal rearward position shown in Fig. 10, or in its forwardly slid position shown in Fig. 15 by the binding nut *e*.

The provision for the forward sliding of the folded up top as a whole is one of great desirability and value in that it lessens in a considerable degree the rearward overhanging of the top and greatly lessens the liability of up and down swaying and jolting, and also permits the use of a large side window.

G G G G represents sash provided window for closing the three openings between the bows $a'$ and *a a a* and between the forward bow and the wind shield frame. The first and third of the windows, reckoning from the front of the vehicle, are, when the top is up and to have the sides thereof closed, supported on the upper edges of the doors B B, while the second and fourth windows are supported on the upper edges of the body side, one between the doors, and another behind the rear door. The lower edges of the windows which are provided for use above the doors have flange-forming thin metallic strips *m* shown in Figs. 4 and 5, for engagement with the step shaped legs *o* provided at the upper edge of the door near its outer face.

Each door is made with a pocket *n* down into which the window may be lowered for an out of the way disposition, it being necessary to this end to slightly lift the window and then slightly inwardly move it before letting it down onto the rest $n^2$ in a lower portion of the pocket; and the handle-provided strap $n^3$ provides a not unusual means for the withdrawal of the window upwardly from the pocket.

The doors are provided at their upper corners with hinged window guides *p p* which by carriage builders are called "flappers," these being swung from their folded down horizontal positions, which they are to occupy at the upper edge of the door when the window is lowered into a pocket, to their vertical window retaining and guiding positions when the window is up, as represented in Fig. 3. These flappers contribute in the guidance of the window upwardly, but the frames or casings for the three rearward windows are constituted by the properly spaced upright and parallel legs of the four bows of the top, as clearly indicated in Figs. 1, 7, 8, 9 and 11; and as particularly shown in Fig. 9 and elsewhere in the drawings, the bow *a* next to the rear of the door has a rabbet forming strip having a length about as great as that of the window, and which measurably conceals the flapper on the inner side of the window casing.

The leg member of the bow comprised in the top which is next forward of the rear door is provided at its inner side with a metallic rabbet-forming piece $r$, which carries a button $r^2$ which overlaps a metallic piece $r^3$ on the sash of the window next forward of the one provided in the space above the door so that by properly turning the button the third window from the rear may be removed from the casement therefor, the base of which is constituted by the upper edge of the body side,—which is provided with a fin or rabbet $s$,—and the opposite sides of which are formed by the forward bow and the one next to the rear thereof.

The rearmost window is represented in horizontal cross section in Fig. 8, and the sash thereof has at its forward edge portion a rabbet piece $t$ which overlaps the bow forward thereof and is engaged by a button $t^2$ on such bow, while the rearward bow $a'$ is provided with a thin metal inwardly opening trough shaped housing $t^3$ in which the extension spring portion $G^2$ of the window is engaged. This extension portion $G^2$ of the sash is one commonly used for windows and screens to adapt them to varying widths between window casings; and such provision is utilized in this case to make each rear window collapsible in width so that it may be contracted rearwardly to be let down into a pocket $n^3$ therefor, which pocket by reason of the location of the rear door opening must in many cases for expediency or construction purposes be located with its forward boundary somewhat to the rearward of the rear door opening, and also to the rearward of the next to the rear bow which forms part of the casing for such rear door.

The third window from the rear on each side of the vehicle may be taken out from the window frame or casing therefor which comprises the legs of the bows, and placed, for instance, within the flap $G^5$ of the rear door as shown in Figs. 5 and 6.

The constructions and arrangements for steadying the windows in the bow forming casings therefor, for preventing displacement of the same inwardly or outwardly and for forming jambs or weather guards, may be variable within the election of the builder; and my invention is not to be limited in respect of these minor details of construction; and in the car such as here represented and which has been built and practically used, it is found preferable to employ four movably fitted windows on the left hand side and but three on the right hand side of the car, a window being omitted from the space above the fore right hand door as rendering the car more desirable, although a sixth dropping window may be provided in this situation if elected.

Inasmuch as many tonneaus or bodies widen rearwardly variously as represented in Figs. 7 and 11, so that normally the bow-legs are most practically slightly nearer together in their forward succession, and in order that these bows may be practically adapted for engagements in the sockets $g$ of the hinged and slidable brackets E E, which are quite widely separated at the rear of the body, I have devised a special construction for those bows forward of the permanently fixed rear bow $a'$, such as represented in Fig. 12 of the drawing, that is one made in hinge connected sections so that the leg members thereof may be distended from their normal relations when the top is to be folded. It is apparent that a bow having substantially this construction may have the legs thereof separated in an increased degree when they are brought to supporting engagement with the opposite brackets E E at the rear of the body. Of course, there may be an extension or reduction in the employment of the idea of means herein set forth for the production of the convertible open touring car and a fully or partially closed vehicle of the limousine or landaulet type; and it is clearly within the province of the constructor to produce a vehicle body having a greater or less number of doors or windows and a top which in accordance therewith would comprise a greater or less number of bows than illustrated in this case.

The studs at the lower ends of the legs of the bows $a\ a\ a$ may be detachably locked in the sockets of the spaced brackets $h$ on the sides of the body by cotter pins, or by any manifest or approved devices, and the foldable top having, when it is up, detachable connection at the front of the car with the upright (wind shield) frame is also prevented from fore and aft swinging or unsteadiness by the duplicated obliquely arranged rear brace $t^5$ which has one end thereof pivotally connected to the rear upper part of the body and its other detachably connected at a suitably high point to the bracket-supported rear bow $a$.

I claim:—

1. The combination with an automobile body having oppositely located brackets at its rear portion, of a foldable top comprising a plurality of bows adapted to have suitably widely separated relations, the rear one of which is secured to said brackets, and the bows forward of the rear one adapted while in such separated relations to be detachably supported in parallelism on the sides of the body, and to be also in their folded relations detachably connected to, and supported by said brackets, members having fore and aft sliding movements at opposite rear portions of the body, to which the said brackets are hinge-connected, and means for confining said members in their forwardly or rearwardly located positions.

2. The combination with an automobile body having horizontally arranged runner bars oppositely located at the rear portion thereof, of slide blocks movably mounted on the runner bars, brackets hinge-connected to the slide blocks, a foldable top comprising a rear bow the depending members of which are fixed to said hinged brackets, and another bow forward of such rear bow, and means comprised in said bracket for the detachable connection with the latter of said forwardly located bow.

3. The combination with an automobile body having horizontally arranged runner bars oppositely located at the rear portion thereof, of slide blocks movably mounted on the runner bars, and means for confining them in their forwardly and rearwardly located positions, brackets hinge-connected to the slide blocks, a foldable top comprising a rear bow the depending members of which are fixed to said hinged brackets, and another bow forward of such rear bow and means comprised in said bracket for the detachable connection with the latter of said forwardly located bow.

4. The combination with an automobile body having horizontally arranged runner bars oppositely located at the rear portion thereof, of slide blocks movably mounted on the runner bars, normally upright brackets hinge-connected to the slide blocks, and having horizontal forwardly projecting extensions provided with upwardly opening sockets, a foldable top comprising a rear bow the depending members of which are fixed to said upright hinged brackets, and other bows forward thereof adapted while in their folded relations to have temporarily supporting engagements in said bracket sockets, and means for detachably supporting the forwardly located bows in their separation on the sides of the body.

5. The combination with an automobile body having horizontally arranged runner bars oppositely located at the rear portion thereof, of constrictive blocks embracing and slidable on the runner bars, and having means for binding them in their forward or rearwardly located relations on said bars, normally upright brackets hinge-connected to the slide blocks, and having horizontal forward extension provided with upwardly opening sockets, a foldable top comprising a rear bow the depending members of which are fixed to said upright hinged brackets, and other bows forward thereof adapted while in their folded relations to have temporary-supporting engagements in said bracket sockets, and means for detachably supporting the forwardly located bows, in separation, on the sides of the body.

6. The combination with an automobile body having brackets oppositely located at its rear portion having opposite sets of brackets in spaced arrangement at its side forward of such rear brackets, and having upwardly opening pockets within its sides between the sidewise located brackets, of a foldable top comprising a rear bow having its depending members secured to the rear brackets while its forward bows in suitably separated relations are adapted to be detachably supported in parallelism by the forwardly located brackets and to have their depending portions form window frames, sash windows removably held within the frame, above the upper edges of the sides of the body, and to be lowered down into said pockets, and slidable means appurtenant to the rear brackets for receiving the temporary connections therewith of the depending members of the forward bows.

7. The combination with an automobile body having oppositely located brackets at its rear portion, of a foldable top comprising a plurality of bows adapted to have separated relations, the rear one of which is secured to said brackets, said brackets adapted for forwardly slidable movement of the automobile body and the bows forward of the rear one adapted while in such separated relation to be detachably supported on the sides of the body and to be also in their folded relation detachably connected to, and supported by said brackets.

8. The combination with an automobile body having oppositely located slidable brackets at its rear portion, of a foldable top comprising a plurality of bows adapted to have separated relations, the rear end of which is pivotally secured to said brackets, and the bows forward of the rear one adapted while in such separated relation to be detachably supported on the sides of the body and to be also in their folded relation detachably connected to, and supported by said brackets, clamping means secured to said brackets and adapted to secure the brackets in their adjusted position.

9. The combination with an automobile body of a foldable top comprising a plurality of bows detachably arranged in spaced relation thereon, a swinging and slidable bracket secured to the opposite ends of the rear bow, said bracket provided with means for supporting the forward bows when in their folded position.

10. The combination with an automobile body of a foldable top comprising a plurality of bows detachably arranged in spaced relation thereon, the rear one of which is provided with brackets on its opposite ends, said brackets having socket portions arranged at right angles to said rear bow adapted to receive the bows forward thereof when in their folded position and means for slidably supporting the brackets upon the said body.

11. The combination with an automobile body of a foldable top comprising a plurality of bows detachably arranged in spaced relation thereon, the rear end of which bows is provided with a bracket arranged on its opposite ends for forward and rearward slidable movement on said body, means for limiting the extent of such movement, said brackets having a portion forward of said bow adapted to detachably confine the bows forward of the rear one when in folded position.

Signed by me at Springfield, Mass., in presence of two subscribing witnesses.

HINSDALE SMITH.

Witnesses:
G. R. DRISCOLL,
WILBER A. STANNARD.